(12) United States Patent
Furman et al.

(10) Patent No.: US 8,469,657 B2
(45) Date of Patent: *Jun. 25, 2013

(54) OPTIMIZED TURBOCHARGER BEARING SYSTEM

(71) Applicant: General Electric Company, Schenectady, NY (US)

(72) Inventors: Anthony Holmes Furman, Scotia, NY (US); Kendall Roger Swenson, Eureka, CA (US); Daniel Edward Loringer, Erie, PA (US); Suresha Kumar Panambur, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,636

(22) Filed: Nov. 8, 2012

(65) Prior Publication Data

US 2013/0067916 A1 Mar. 21, 2013

Related U.S. Application Data

(63) Continuation of application No. 12/328,653, filed on Dec. 4, 2008, now Pat. No. 8,328,506.

(51) Int. Cl.
*F01D 11/11* (2006.01)

(52) U.S. Cl.
USPC ...................................................... 415/173.7

(58) Field of Classification Search
USPC ............... 415/173.7, 111, 230; 384/286, 368, 384/115, 17, 114; 417/407, 289; 702/158
See application file for complete search history.

(56) References Cited

U.S. PATENT DOCUMENTS

| | | | | |
|---|---|---|---|---|
| 4,427,309 A | * | 1/1984 | Blake | 384/286 |
| 5,455,778 A | * | 10/1995 | Ide et al. | 703/1 |
| 5,459,674 A | * | 10/1995 | Ide et al. | 703/1 |
| 6,625,507 B1 | * | 9/2003 | Dickerson et al. | 700/97 |
| 6,739,845 B2 | * | 5/2004 | Woollenweber | 417/407 |
| 6,868,363 B2 | * | 3/2005 | Baran et al. | 702/158 |
| 7,948,105 B2 | * | 5/2011 | Agrawal et al. | 290/52 |
| 8,328,506 B2 | * | 12/2012 | Furman et al. | 415/173.3 |
| 2010/0143104 A1 | * | 6/2010 | Furman et al. | 415/173.7 |

* cited by examiner

*Primary Examiner* — Alexander Gilman
(74) *Attorney, Agent, or Firm* — John A. Kramer; GE Global Patent Operation

(57) ABSTRACT

A turbocharger system, in certain embodiments, includes a compressor, a turbine, a shaft of common diameter coupling the compressor to the turbine, and a first fluid film bearing disposed about the shaft at a compressor end portion of the shaft. The system also includes a second fluid film fixed pad bearing disposed about the shaft at a turbine end portion of the shaft, wherein the first and second fluid film fixed pad bearings have different clearance ratios, effective lengths, or both, relative to one another. The system, in some embodiments, includes a compressor fluid film fixed pad bearing and a turbine fluid film fixed pad bearing, wherein the compressor and turbine fluid film fixed pad bearings have different clearance ratios and effective lengths, relative to one another.

20 Claims, 10 Drawing Sheets

OPTIMIZED TURBOCHARGER BEARING SYSTEM

BACKGROUND OF THE INVENTION

Embodiments of the disclosure relate generally to a system and method of improving the performance of a turbocharger for a compression-ignition engine and, more specifically, to a system and method for adjusting parameters of components within the turbocharger.

Turbochargers include a turbine and a compressor that may be connected by a shaft. This turbocharger rotor assembly may rotate on a plurality of fixed pad journal bearings that may experience imbalance load and sub-synchronous vibration depending on the operating speed, oil temperature, and other conditions. The imbalance load and sub-synchronous vibration that occurs in the rotor assembly may be transferred to other components of the turbocharger, causing wear as well as reduced performance. Further, high imbalance load may cause excessive wear on the journal bearings and potential bearing failure.

BRIEF DESCRIPTION OF THE INVENTION

A turbocharger system, in certain embodiments, includes a compressor, a turbine, a shaft of common diameter coupling the compressor to the turbine, and a first fluid film fixed pad bearing disposed about the shaft at a compressor end portion of the shaft. The system also includes a second fluid film fixed pad bearing disposed about the shaft at a turbine end portion of the shaft, wherein the first and second fluid film fixed pad bearings have different clearance ratios, effective lengths, or both, relative to one another. The system, in some embodiments, includes a compressor fluid film fixed pad bearing and a turbine fluid film fixed pad bearing, wherein the compressor and turbine fluid film fixed pad bearings have different clearance ratios and effective lengths relative to one another.

DETAILED DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 9:
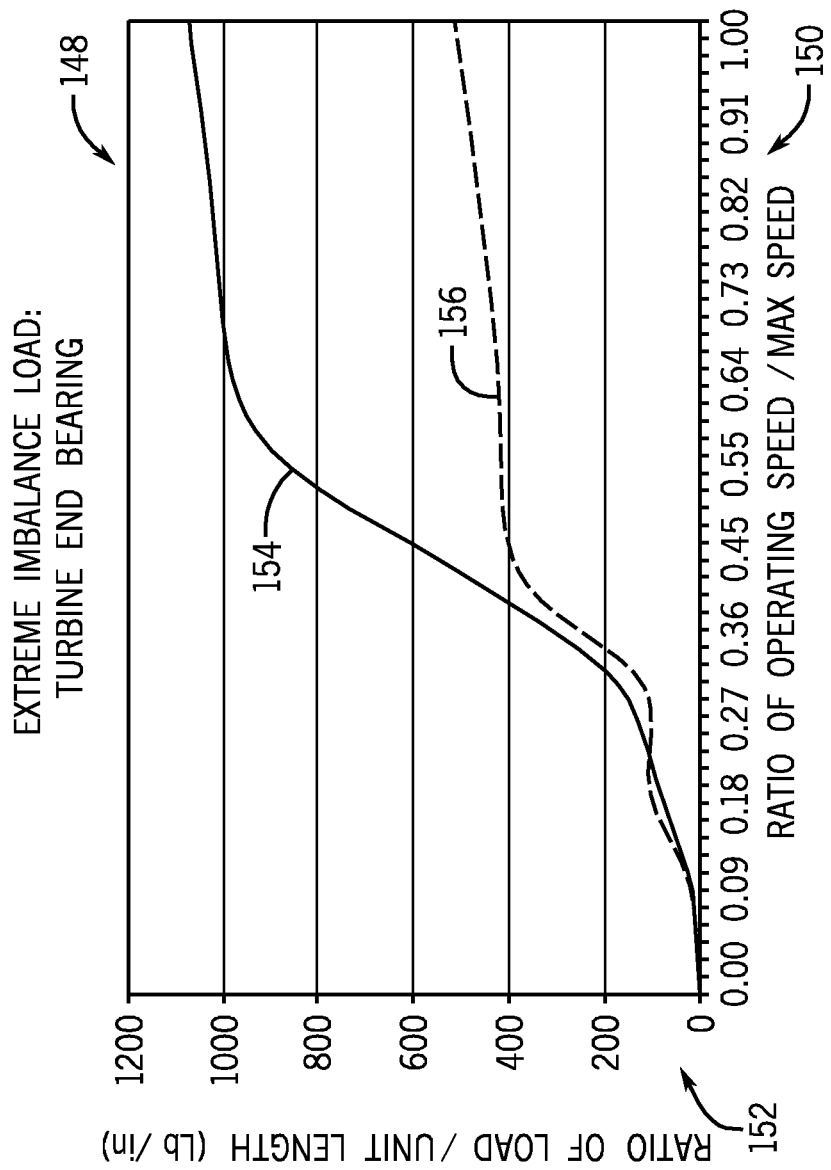
Figure 10:
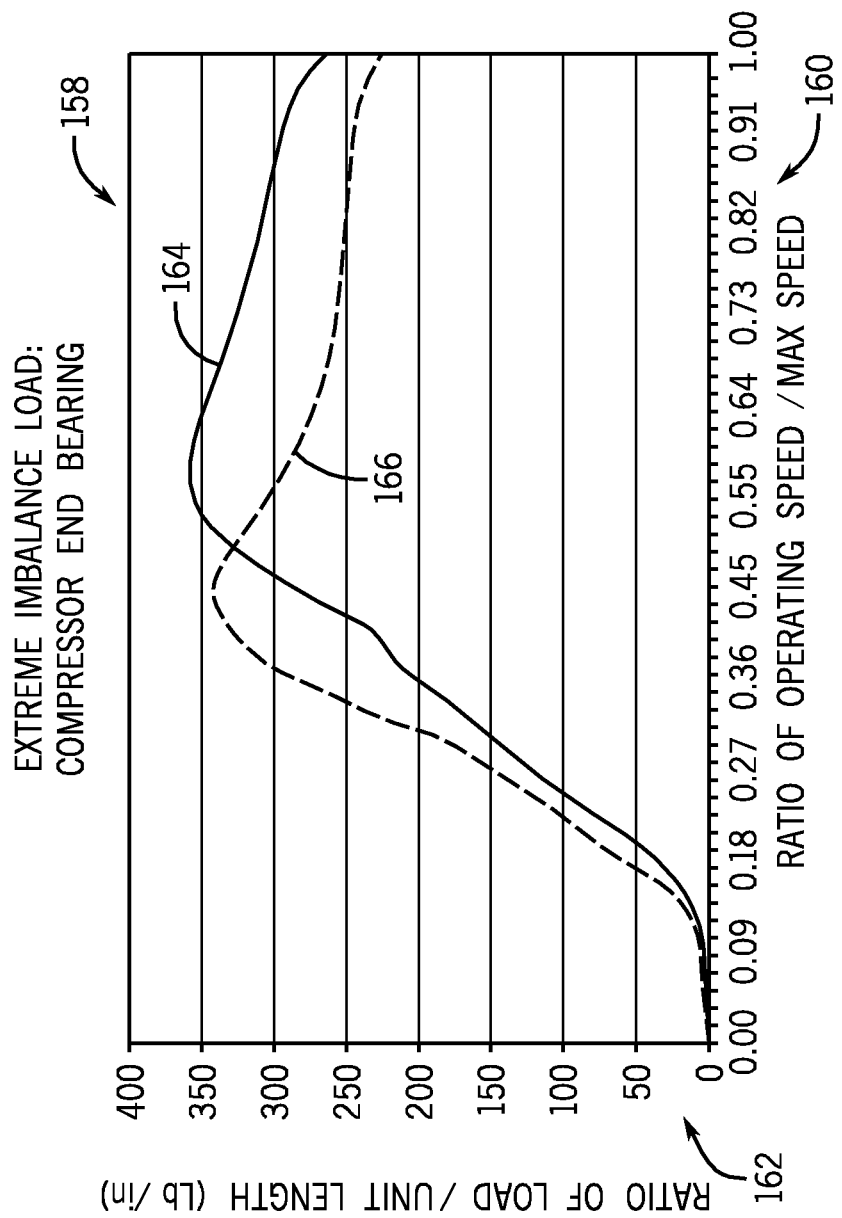

FIG. 9 is a chart of an extreme imbalance load at the turbine end bearing, including a ratio of load per unit length versus a ratio of operating speed to maximum speed, thereby illustrating improvements achieved via embodiments of a unique bearing system; and FIG. 10 is a chart of an extreme imbalance load for a compressor bearing, including a ratio of load per unit length versus a ratio of operating speed to maximum speed, thereby illustrating improvements achieved via embodiments of a unique bearing system.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various configurations of turbocharger bearings and bearing parameters may be employed to reduce imbalance loads in the bearings, reduce sub-synchronous vibration, reduce turbocharger component wear, and/or improve performance of the turbocharger system. In particular, certain performance parameters, such as imbalance load and sub-synchronous vibration, diverge (or are inversely proportional) from one another in response to changes in certain design parameters. For example, certain bearing parameters, such as effective length, clearance, and drop cause inversely proportional changes in imbalance load capability and sub-synchronous vibration. For example, a lower bearing clearance and a longer bearing effective length will lead to higher imbalance load on the bearing for a given state of balance in the rotor, though it will also result in a desirable reduction of the sub-synchronous vibration at high speed. This reduction is due to improved stability characteristics that increase the threshold instability speed outside of the turbocharger operating speed range. A higher bearing clearance and lower bearing effective length can lead to sub-synchronous vibration, although the imbalance load experienced by the bearing will be lower. The embodiments discussed below address this problem by arriving at unique bearing clearance, drop, and effective length parameters for a compressor bearing and a turbine bearing of a turbocharger.

Figure 1:
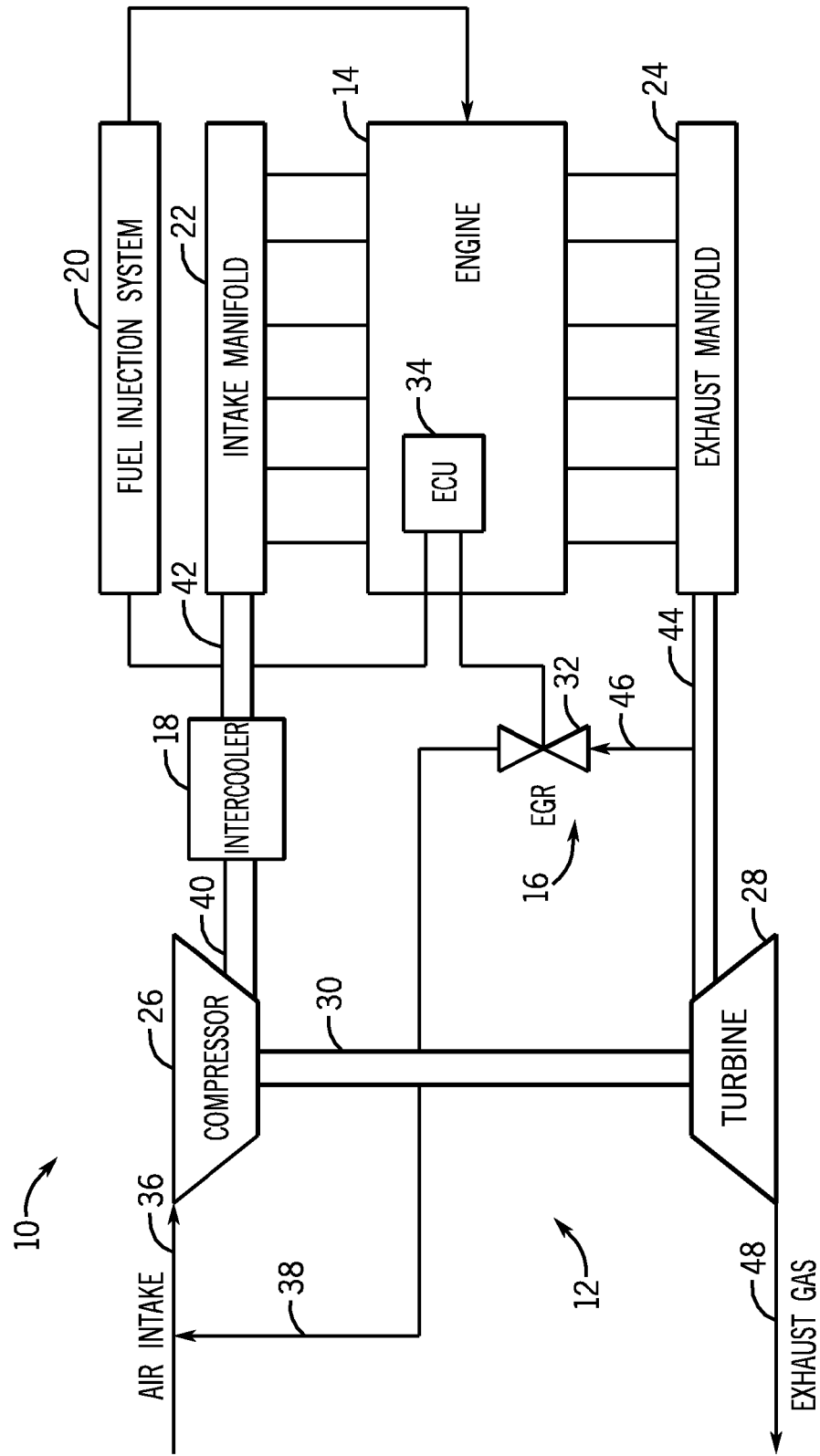
FIG. 1 is a block diagram of an embodiment of a system having an engine coupled to a turbocharger having a unique bearing system.

FIG. 1 is a block diagram of a system 10 having a turbocharger 12 coupled to an engine 14, in accordance with certain embodiments of the present technique. The system 10 may include a vehicle, such as a locomotive, an automobile, a bus, or a boat. Alternatively, the system 10 may include a stationary system, such as a power generation system having the engine 14 coupled to a generator. The illustrated engine 14 is a compression-ignition engine, such as a diesel engine. However, other embodiments of the engine 14 include a spark-ignition engine, such as a gasoline-powered internal combustion engine.

As illustrated, the system 10 includes an exhaust gas recirculation (EGR) system 16, an intercooler 18, a fuel injection system 20, an intake manifold 22, and an exhaust manifold 24. The illustrated turbocharger 12 includes a compressor 26 coupled to a turbine 28 via a drive shaft 30. The EGR system 16 may include an EGR valve 32 disposed downstream from the exhaust manifold 24 and upstream from the compressor 26. In addition, the system 10 includes a controller 34, e.g., an electronic control unit (ECU), coupled to various sensors and devices throughout the system 10. For example, the illustrated controller 34 is coupled to the EGR valve 32 and the fuel injection system 20. However, the controller 34 may be coupled to sensors and control features of each illustrated component of the system 10, among many others.

As illustrated in FIG. 1, the system 10 intakes air into the compressor 26 as illustrated by arrow 36. In addition, as discussed further below, the compressor 26 may intake a portion of the exhaust from the exhaust manifold 24 via control of the EGR valve 32 as indicated by arrow 38. In turn, the compressor 26 compresses the intake air and a portion of the engine exhaust and outputs the compressed gas to the intercooler 18 via a conduit 40. The intercooler 18 functions as a heat exchanger to remove heat from the compressed gas as a result of the compression process. As appreciated, the compression process typically heats up the intake air, and thus is cooled prior to intake into the intake manifold 22. As further illustrated, the compressed and cooled air passes from the intercooler 18 to the intake manifold 22 via conduit 42.

The intake manifold 22 then routes the compressed gas into the engine 14. The engine 14 then compresses this gas within various piston cylinder assemblies, e.g., 4, 6, 8, 10, 12, or 16 piston cylinder assemblies. Fuel from the fuel injection system 20 is injected directly into engine cylinders. The controller 34 may control the fuel injection timing of the fuel injection system 20, such that the fuel is injected at the appropriate time into the engine 14. The heat of the compressed air ignites the fuel as each piston compresses a volume of air within its corresponding cylinder.

In turn, the engine 14 exhausts the products of combustion from the various piston cylinder assemblies through the exhaust manifold 24. The exhaust from the engine 14 then passes through a conduit 44 from the exhaust manifold 24 to the turbine 28. In addition, a portion of the exhaust may be routed from the conduit 44 to the EGR valve 32 as illustrated by arrow 46. At this point, a portion of the exhaust passes to the air intake of the compressor 26 as illustrated by the arrow 38, as mentioned above. The controller 34 controls the EGR valve 32, such that a suitable portion of the exhaust is passed to the compressor 26 depending on various operating parameters and/or environmental conditions of the system 10. As depicted, the exhaust gas drives the turbine 28, such that the turbine rotates the shaft 30 and drives the compressor 26. The exhaust gas then passes out of the system 10 and particularly the turbine 28, as indicated by arrow 48. As compressor 26 is driven, additional air intake occurs, thereby improving performance, power density, and efficiency in the engine by providing additional air for the combustion process.

As will be discussed in detail below, the optimization of certain parameters of a turbocharger's fixed pad journal bearings may reduce wear and improve performance of the turbocharger system. For example, by modifying parameters of the two journal bearings that support shaft 30, imbalance load on the bearings may be reduced while improving the stability of the bearings. These improvements lead to decreased power consumption, a reduction in the temperature of oil at high rotational speeds, and reduced wear on the bearing inner surface. In particular, under some conditions, imbalance loading on the bearings and shaft 30 may become much higher due to exhaust deposits on the blades of turbine 28. As will be discussed below, these deposits on the turbine blades may cause a high imbalance load on the journal bearings that increases as the rotational speed of the turbine 28 and attached shaft 30 increases. Specifically, the deposits may break off from a portion of the blades, while remaining on another portion of the blades, causing an imbalance during rotation of the turbine blades. For instance, in one case, the deposits may be removed from a portion of the turbine blades while remaining on a portion of the turbine blades. This situation will cause an increased imbalance load in the journal bearings during rotation of the turbine blades. The disclosed embodiments reduce the effect of these factors on the operation of the turbocharger 12.

Figure 2:
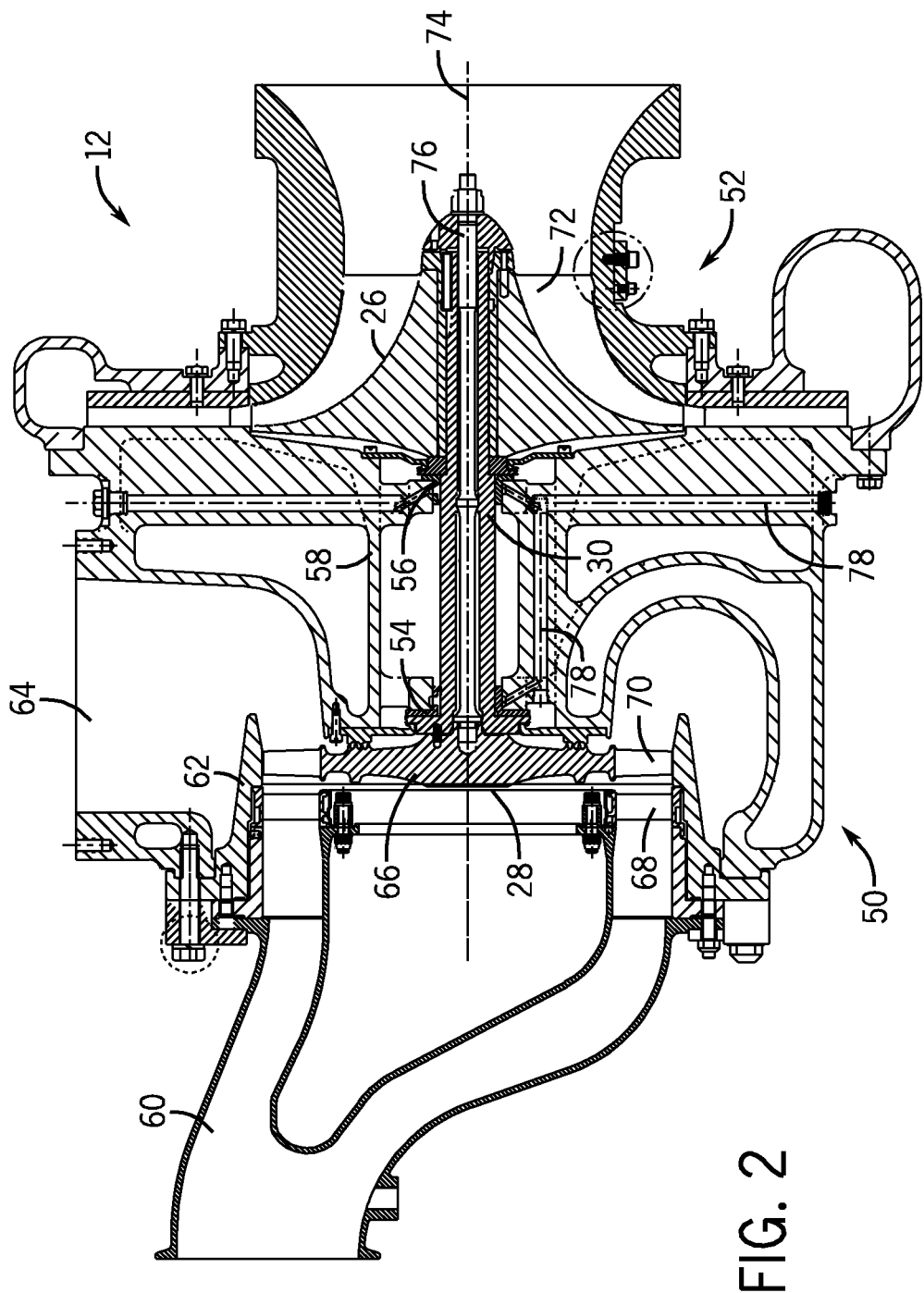
FIG. 2 is a cutaway side view of an embodiment of a turbocharger having a unique bearing system.

FIG. 2 shows a cutaway side view of an embodiment of turbocharger 12. The illustrated embodiment of turbocharger 12 includes turbine end 50 and compressor end 52. As depicted, turbine 28 is located in turbine end 50 and compressor 26 is located in compressor end 52. Compressor 26 and turbine 28 are coupled via rotatable shaft 30. Turbine 28 and compressor 26 each include a plurality of radial blades or buckets extending outwardly from shaft 30. Shaft 30 may be supported by a uniquely designed bearing system that includes turbine end bearing 54 and compressor end bearing 56. The bearing system may be configured to provide both radial support and axial support to shaft 30. In the illustrated embodiment, turbine end bearing 54 and compressor end bearing 56 are fixed pad journal bearings. As discussed herein, a fixed pad journal bearing is a bearing in which a shaft, or journal may turn in a bearing with a layer of oil, grease, or lubricant separating the two parts through fluid dynamic effects.

In operation, shaft 30 may be supported by a film of lubricating fluid, such as oil, in the journal bearings 54 and 56. Turbine end bearing 54 is coupled to and located inside of turbine casing 58. As depicted, transition section 60 draws exhaust gas into the turbocharger via passages, including through shroud 62, into exhaust outlet 64. Exhaust gas causes rotation of rotor disc 66 as it passes through nozzle ring 68 and buckets 70 (e.g., plurality of radial blades), which are coupled to rotor disc 66. For example, blades or buckets 70 are angled in a manner to cause rotation of rotor disc 66, shaft 30, and compressor 26 as exhaust gas flows from transition section 60 to exhaust outlet 64. In turn, compressor blades 72 of compressor 26 are angled in a manner to compress and force air into the intake manifold 22 of engine 14 in response to rotation of turbine 28. An increased air intake into engine 14 may improve efficiency and performance of the engine. As shown, elements coupled to shaft 30 rotate about axis 74 while in operation. Fixed pad journal bearings 54 and 56 are configured to provide both radial support and axial support along axis 74 of shaft 30. In the embodiment, shaft 30 includes a stud 76 located inside shaft 30 which may provide support to the shaft 30 and its attached components. As depicted, lubricating fluid may be fed at elevated pressure from a reservoir through an oil supply circuit 78 to turbine end bearing 54 and compressor end bearing 56. The oil film thus formed between the rotating shaft and fixed pads of the bearings provides sufficient support to eliminate contact between the shaft and bearing. As discussed herein, improvements in the design of turbine end bearing 54 and compressor end bearing 56 may lead to improved performance and reduced wear in turbocharger 12.

Figure 3:
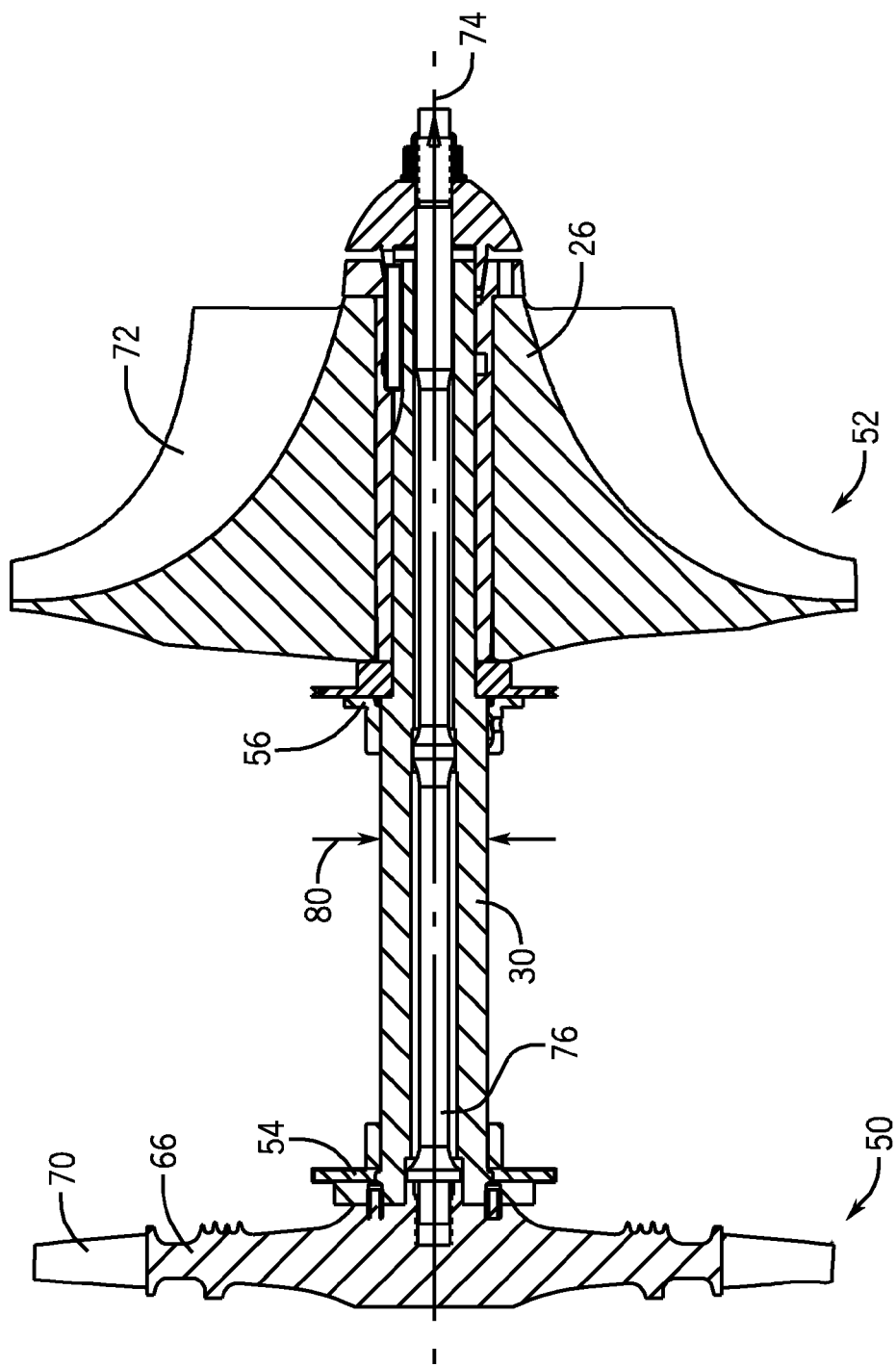
FIG. 3 is a cutaway side view of an embodiment of a rotor with a compressor end bearing, a shaft, and a turbine end bearing of a turbocharger, as illustrated in FIG. 2.

FIG. 3 shows a detailed cutaway side view illustration of an embodiment including turbine disc 66, turbine end bearing 54, shaft 30, compressor end bearing 56, and compressor 26. In the embodiment, turbine disc 66, shaft 30, stud 76, and compressor 26 rotate about axis 74 when the turbocharger is in operation. As appreciated, the aforementioned components may rotate as shaft 30 rotates inside stationary turbine end bearing 54 and compressor end bearing 56, which may be lubricated with oil, or other suitable lubricant. A journal shaft diameter 80 is configured to rotate within an inner diameter of journal bearings 54 and 56. As discussed below, parameters of turbine end bearing 54 and compressor end bearing 56 may be modified to minimize wear and vibration in the bearings and turbocharger components that results from increasingly higher imbalance levels due to depositions on the turbine blades and compressor wheel in service.

Figure 4:
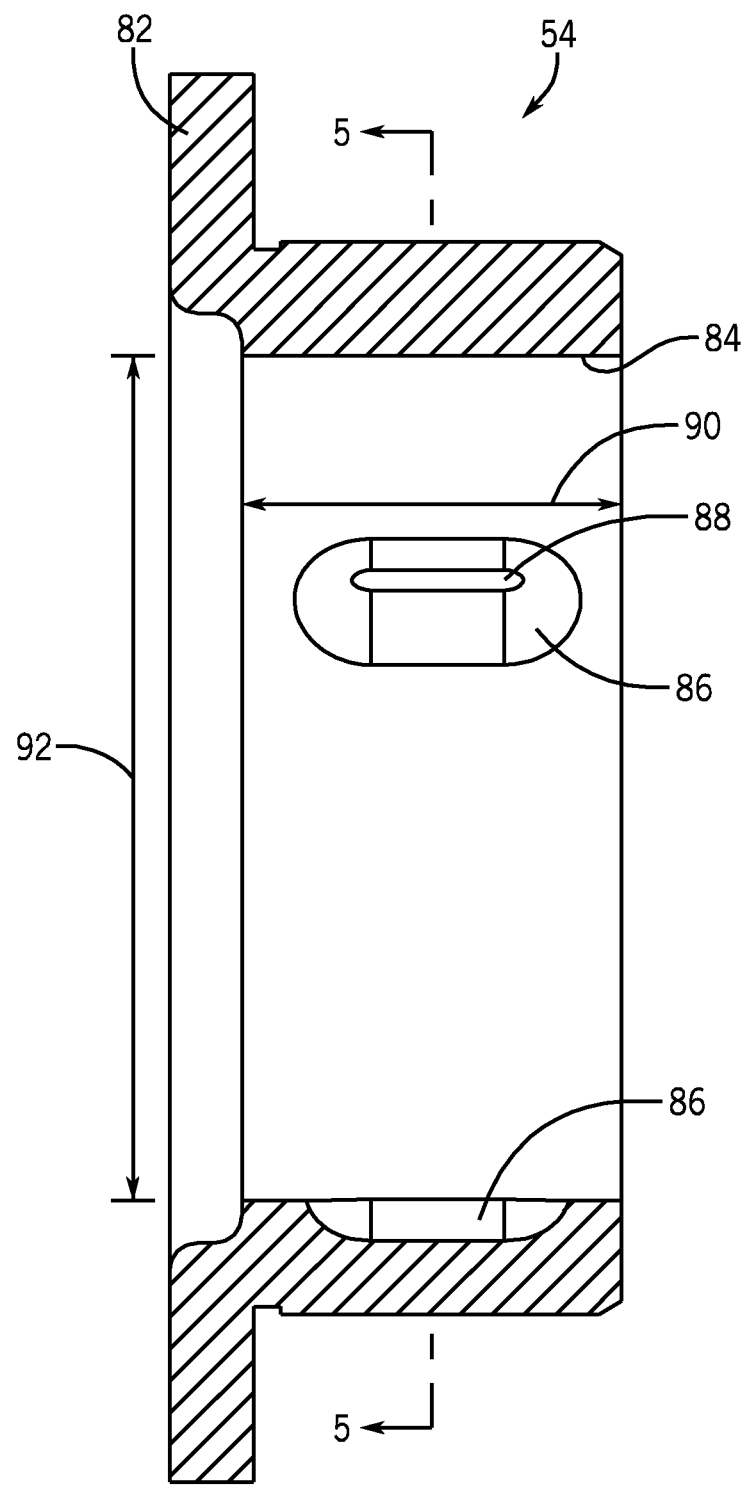
FIG. 4 is a cutaway side view an embodiment of a turbine end bearing of a turbocharger.

FIG. 4 illustrates a cutaway side view of an embodiment of an exemplary fixed pad journal bearing. In the illustrated embodiment, turbine end bearing 54 is shown. The parameters and components of exemplary turbine end bearing 54 may be modified and different from those of compressor end bearing 56 to optimize bearing and turbocharger performance. For example, bearing parameters such as effective length, clearance, and drop may be different between the turbine end bearing 54 and compressor end bearing 56. The clearance parameter may also be discussed as a ratio of a clearance divided a shaft diameter. This parameter is referred to as a clearance ratio. Turbine end bearing 54 may have a drop of 6-10 mils (1 mil=1/1000 inch), effective length 0.7-0.95 inch, and clearance ratio of 1.33 to 2.93 mils/inch. In an embodiment, turbine end bearing 54 may have a drop of 8 mils, effective length 0.84 inch, and clearance ratio of 2.06 mils/inch. Compressor end bearing 56 may have a drop of 6-10 mils, effective length 1.0-1.2 inch, and clearance ratio Z1 1.33 to 2.93 mils/inch. In an embodiment, compressor end bearing 56 may have a drop of 8 mils, effective length 1.1 inch, and clearance ratio of 1.9 mils/inch.

In certain embodiments, turbine end bearing 54 may have a lesser effective length than compressor end bearing 56, but a generally equal drop. For example, compressor end bearing 56 may have an effective length measuring at least about 30% more than the effective length of turbine end bearing 54. In addition, turbine end bearing 54 may have a greater clearance ratio than compressor end bearing 56. For example, compressor end bearing 56 may have a first clearance ratio measuring at least about 10% less than a second clearance ratio of turbine end bearing 54. The drops of bearings 54 and 56 may also be increased in an embodiment, thereby reducing the temperature rise of oil lubricating the bearings, which in turn leads to a reduction in parasitic power loss in the turbocharger. The above changes may reduce imbalance loads in the compressor end bearing 56 caused by synchronous imbalance in the rotor assembly. Further, increasing the effective length of compressor end bearing 56 increases stability to account for a decrease in stability of the rotor system at high speed caused by increasing the clearance ratio of compressor end bearing 56 and increasing the clearance ratio in the turbine end bearing 54.

As depicted, turbine end bearing 54 includes flange 82. Flange 82 may be used to rigidly couple the journal bearing to its location within turbine casing 58. Inner journal surface 84 may be of sufficient smooth finish to allow shaft 30 to freely rotate within the journal bearing. Shaft rotation within turbine end bearing 54 may be facilitated by oil that may be fed to the bearing via oil feed groove 86 and oil inlet 88. In an embodiment, oil inlet 88 may be connected to oil supply circuit 78. For instance, three sets of oil feed grooves 86 and oil inlets 88 may be equally spaced about inner journal surface 84. As will be discussed below, the inner journal surface 84 may converge or slope inward from the oil feed grooves 86 in the direction of shaft rotation. Effective length 90 is shown as the axial length of the inner journal surface 84. Effective length 90 is the length over which a lubricating fluid film is active in the fixed pad journal bearing 54. In addition, effective length 90 of the inner journal surface 84 may directly affect the amount of a load that the journal bearing can permit. The diameter of the inner surface of the journal bearing 54 is generally depicted by numeral 92.

Figure 5:
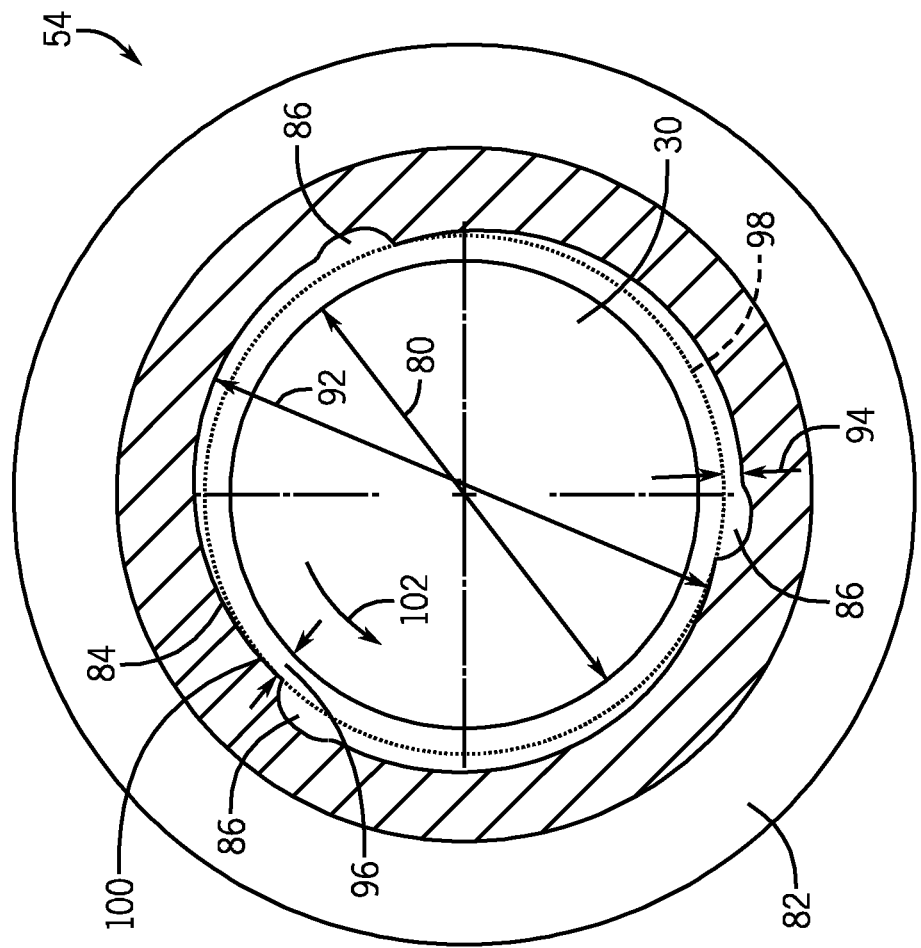
FIG. 5 is a cutaway end view an embodiment of a turbine end bearing of a turbocharger, as shown in FIG. 4.

FIG. 5 shows a detailed cutaway view of an embodiment of turbine end bearing 54 taken along line 5-5 of FIG. 4. As depicted, shaft diameter 80 is less than the inner bearing surface diameter 92, thereby allowing shaft 30 to rotate freely inside a lubricated turbine end bearing 54. Also included in turbine end bearing 54 are three oil feed grooves 86 spaced equally throughout inner journal surface 84 of the bearing. Clearance 96 is the distance between shaft diameter 80 (i.e., outer circumference of shaft 30), and concentric circle 98. As shown, concentric circle 98 is used to represent a circle with a constant diameter equal to the minimum diameter of inner journal surface diameter 92. In the embodiment, the distance between concentric circle 98 and inner journal surface diameter 92 is largest near oil feed grooves 86 to enable distribution of the lubricating oil as shaft 30 rotates in a counterclockwise direction 102. The inner bearing surface 84 converges toward concentric circle 98 generally until the end of converging surface, which is represented by numeral 100. In other words, at point 100, inner bearing surface 84 and concentric circle 98 generally converge with one another. Inner journal surface 84 converges in shaft rotation direction 102. Clearance 96 may be described as a function of a clearance ratio, e.g., the clearance 96 divided by journal diameter 80. Distribution and flow of oil from oil feed grooves 86 and the converging portion of inner journal surface 84 results in an improved dynamic behavior between the outer surface of shaft 30 and the inner surface 84 of the journal bearing. In the embodiment, drop 94 is a parameter that is used to indicate the distance between concentric circle 98 and the beginning of the converging portion of oil feed groove 86.

Figure 6:
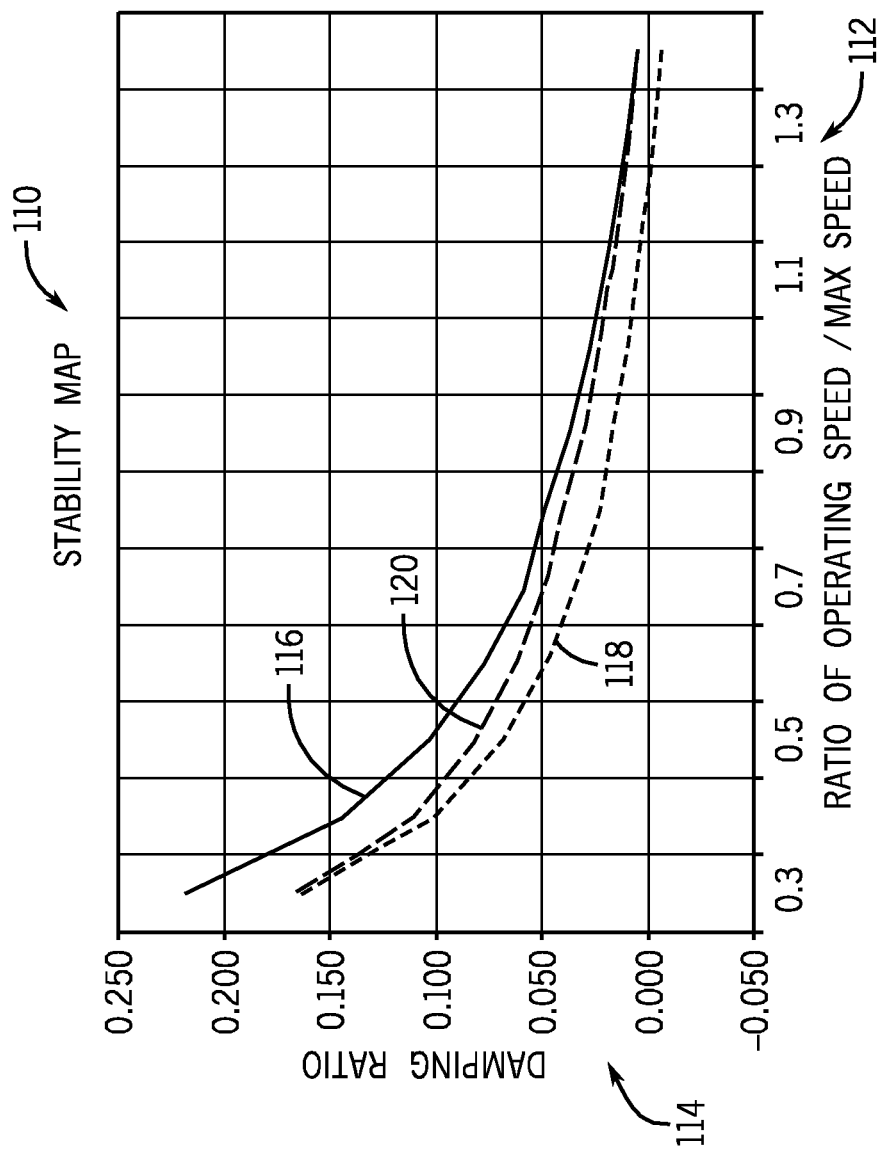
FIG. 6 is a chart of a stability map of damping ratio versus a ratio of operating speed to maximum speed, thereby illustrating improvements achieved via embodiments of a unique bearing system.

FIG. 6 is a chart 110, illustrating the stability of an embodiment of a bearing system 10, including turbine end bearing 54 and compressor end bearing 56, over a range of operating speeds 112. An x-axis 112 is the ratio of operating speed to maximum speed, which provides an indication of the rotational speed of the journal shaft 30 within the bearings. The y-axis 114 illustrates the damping ratio of the bearing system across the range of speeds. As the damping ratio approaches zero or is less than zero, the system becomes potentially unstable. Line 116 shows the performance of the bearing system 10 prior to the modifications discussed above, i.e., wherein the system 10 parameters of the turbine and compressor end bearings 54 and 56 are the same. Line 118 shows the effect of modifying the drop and/or clearance parameters of the turbine and compressor end bearings 54 and 56 to improve tolerance to imbalance. Line 120 reflects the improved stability of the system with the changes of line 118, along with an increase in the effective length of compressor end bearing 56. As is shown in the chart, the stability of the bearing system is maintained as changes are implemented in bearing parameters, while significantly reduce the effects of an imbalance load on the bearings.

Figure 7:
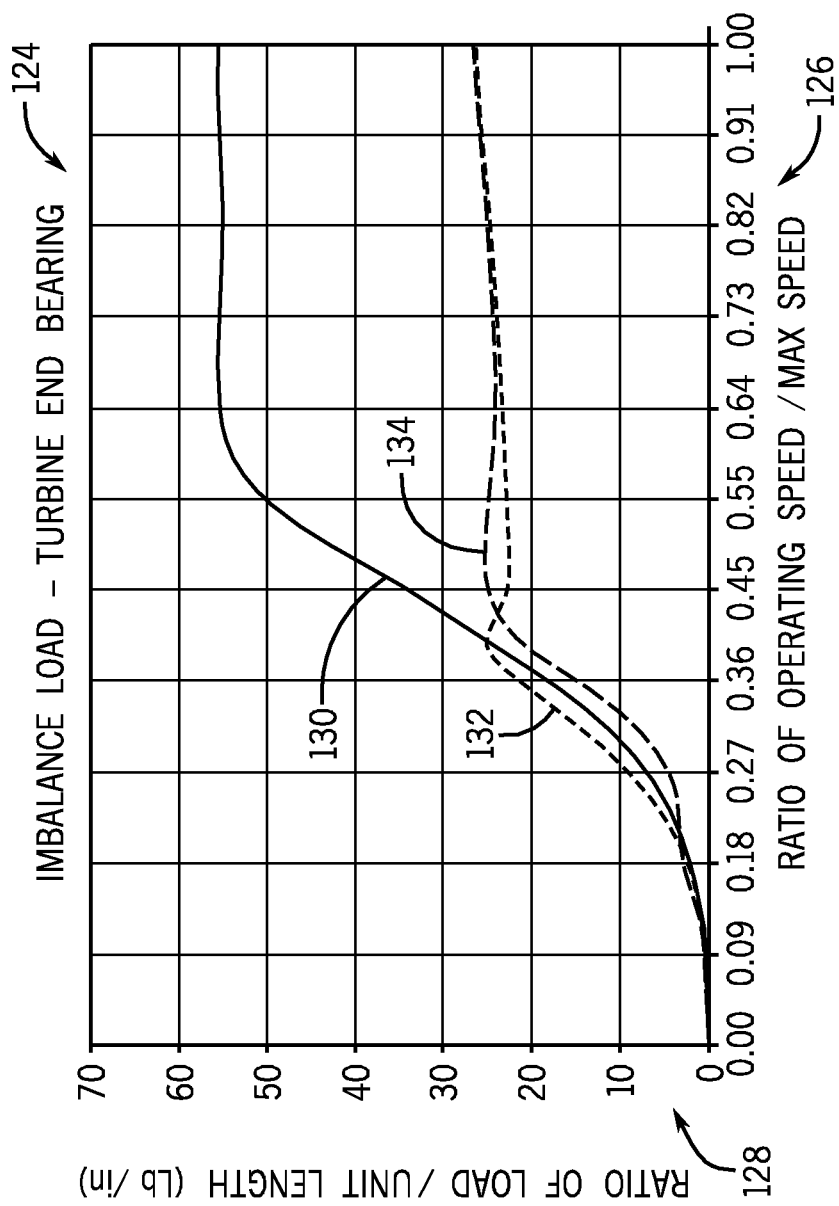
FIG. 7 is a chart of imbalance load for a turbine end bearing, including a ratio of load per unit length versus a ratio of operating speed to maximum speed, thereby illustrating improvements achieved via embodiments of a unique bearing system.

FIG. 7 is a chart 124, illustrating a typical imbalance load on the turbine end bearing 54, over the range of operating speeds 126. The x-axis 126 shows the ratio of operating speed to maximum rotational speed of the journal shaft 30 within the turbine end bearing 54. The y-axis 128 illustrates the ratio of the bearing imbalance load divided by the effective length of the turbine end bearing 54 across the range of speeds. Line 130 shows the performance of the bearing system prior to the modifications discussed above, i.e., wherein the system 10 parameters of the turbine and compressor end bearings 54 and 56, respectively, are the same. Line 132 shows the effect of modifying the drop and/or clearance parameters of the turbine and compressor end bearings 54 and 56. Line 134 reflects the effect of the imbalance on the bearing with the changes of line 132 along with an increase in the effective length of compressor end bearing 56. As is shown in the chart, a desirable reduction in imbalance load on turbine end bearing 54 is obtained as bearing parameters are modified.

Figure 8:
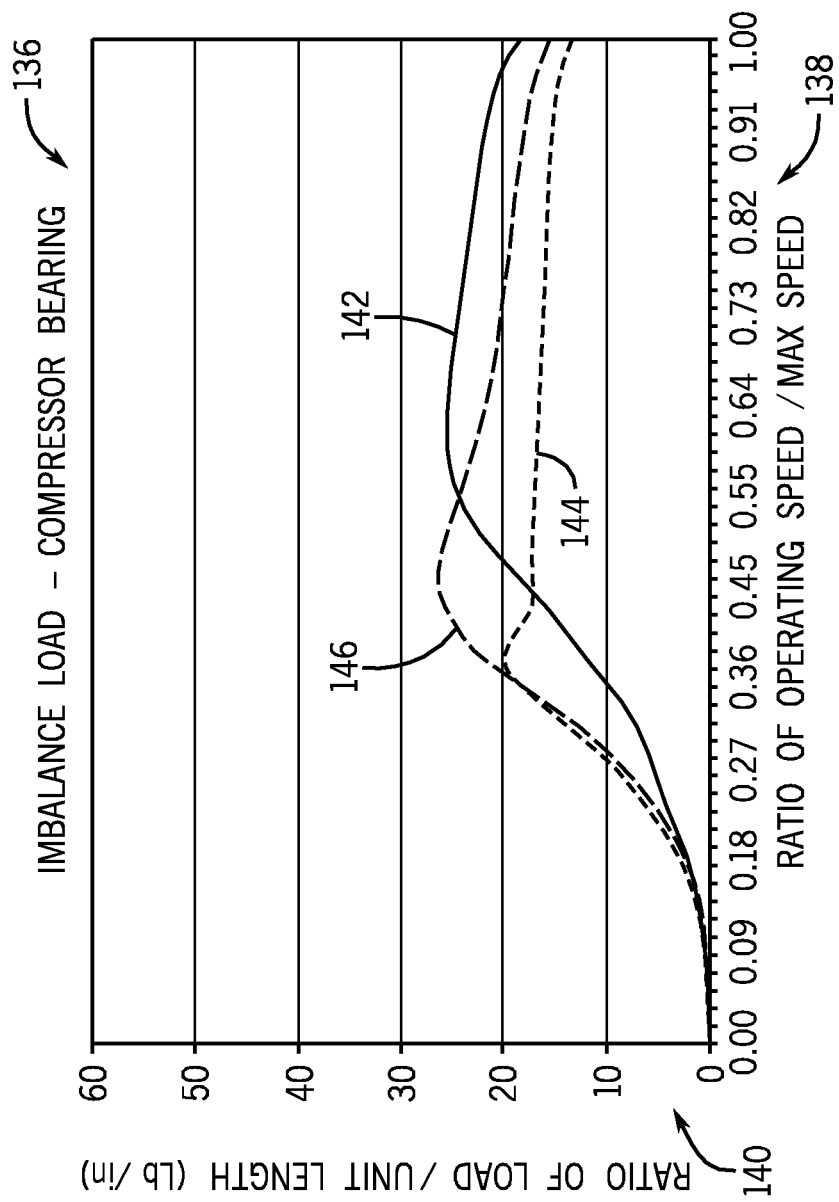
FIG. 8 is a chart of imbalance load for a compressor bearing, including a ratio of load per unit length versus a ratio of operating speed to maximum speed, thereby illustrating improvements achieved via embodiments of a unique bearing system.

FIG. 8 is a chart 136 of imbalance load for a compressor bearing, including a ratio of operating speed to maximum speed 138 versus ratio of load per unit length 140. Line 142 shows the performance of the bearing system prior to the modifications discussed above, i.e., wherein the system 10 parameters of the turbine and compressor end bearings 54 and 56, respectively, are the same. Line 144 shows the effect of modifying the drop and/or clearance parameters of the turbine and compressor end bearings 54 and 56. Line 146 reflects the effect of the imbalance on the bearing with the changes of line 144 along with an increase in the effective length of compressor end bearing 56.

FIG. 9 is a chart 148 of imbalance load for a turbine end bearing caused by a highly imbalanced rotor, including a ratio of operating speed to maximum speed 150 versus a ratio of load per unit length 152, thereby illustrating improvements achieved via embodiments of a unique bearing system. The chart 148 illustrates how an extreme case of rotor imbalance can impact bearing loads. In the chart 148, line 154 shows the performance of the bearing system prior to the modifications discussed above, i.e., wherein the system 10 parameters of the turbine and compressor end bearings 54 and 56, respectively, are the same. Line 156 shows the effect of modifying the drop and/or clearance parameters of the turbine and compressor end bearings 54 and 56 along with an increase in the effective length of compressor end bearing 56.

FIG. 10 is a chart 158 of imbalance load for a compressor bearing caused by a highly imbalanced rotor, including a ratio of operating speed to maximum speed 160 versus a ratio of load per unit length 162, thereby illustrating improvements achieved via embodiments of a unique bearing system. Line 164 shows the performance of the bearing system prior to the modifications discussed above, i.e., wherein the system 10 parameters of the turbine and compressor end bearings 54 and 56, respectively, are the same. Line 166 shows the effect of modifying the drop and/or clearance parameters of the turbine and compressor end bearings 54 and 56 along with an increase in the effective length of compressor end bearing 56.

The technical effect of exemplary embodiments of the present disclosure is to provide for a system and method improving the performance and reliability of a turbocharger and optimizing journal bearing component parameters to achieve these improvements, as discussed in detail above with reference to FIGS. 1-10. Thus, the embodiments described above may be implemented on a suitable computer system, controller, memory, or generally a machine readable medium. For example, each step, related equations, and modeling technique may correspond to a computer instruction, logic, or software code disposed on the machine readable medium. Further, the computer-implemented methods and/or computer code for modeling such parameters may be utilized to simulate turbocharger performance prior to manufacturing prototypes and implementing changes to the parameters.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A turbocharger, comprising:
   a compressor;
   a turbine;
   a shaft coupling the compressor to the turbine;
   a first fluid film fixed pad bearing disposed about the shaft at a compressor end portion of the shaft; and
   a second fluid film fixed pad bearing disposed about the shaft at a turbine end portion of the shaft, wherein the first and second fluid film fixed pad bearings have different clearance ratios relative to one another, different effective lengths relative to one another, or both different clearance ratios and different effective lengths relative to one another.

2. The turbocharger of claim 1, wherein the second fluid film fixed pad bearing has a lesser effective length than an effective length of the first fluid film fixed pad bearing.

3. The turbocharger of claim 2, wherein the effective length of the first fluid film fixed pad bearing is at least about 30% more than the effective length of the second fluid film fixed pad bearing.

4. The turbocharger of claim 1, wherein the second fluid film fixed pad bearing has a greater clearance ratio than a clearance ratio of the first fluid film fixed pad bearing.

5. The turbocharger of claim 4, wherein the clearance ratio of the first fluid film fixed pad bearing is at least about 10% less than the clearance ratio of the second fluid film fixed pad bearing.

6. The turbocharger of claim 1, wherein:
   the second fluid film fixed pad bearing has an effective length of 0.7 to 0.95 inch and a clearance ratio of 1.33 to 2.93 mils/inch; and
   the first fluid film fixed pad bearing has an effective length 1.0 to 1.2 inch and a clearance ratio of 1.33 to 2.93 mils/inch.

7. The turbocharger of claim 6, wherein:
   the second fluid film fixed pad bearing has a drop of 6 to 10 mils; and
   the first fluid film fixed pad bearing has a drop of 6 to 10 mils.

8. The turbocharger of claim 7, wherein the drop of the first fluid film fixed pad bearing is the same as the drop of the second fluid film fixed pad bearing.

9. The turbocharger of claim 7, wherein the drop of the first fluid film fixed pad bearing is different than the drop of the second fluid film fixed pad bearing.

10. The turbocharger of claim 1, wherein the first fluid film fixed pad bearing has a drop that is the same as a drop of the second fluid film fixed pad bearing.

11. The turbocharger of claim 1, wherein the first fluid film fixed pad bearing has a drop that is different than a drop of the second fluid film fixed pad bearing.

12. An engine comprising:
plural piston cylinder assemblies;
an intake manifold operably coupled to the plural piston cylinder assemblies for providing intake air to the plural piston cylinder assemblies;
an exhaust manifold operably coupled to the plural piston cylinder assemblies for routing exhaust away from the plural piston cylinder assemblies; and
a turbocharger as recited in claim 1, wherein the compressor is fluidly coupled to the intake manifold and the turbine is fluidly coupled to the exhaust manifold.

13. A turbocharger, comprising:
a compressor;
a turbine;
a shaft coupling the compressor to the turbine;
a first fluid film fixed pad bearing disposed about the shaft at a compressor end portion of the shaft; and
a second fluid film fixed pad bearing disposed about the shaft at a turbine end portion of the shaft, wherein the first and second fluid film fixed pad bearings have different effective lengths relative to one another.

14. The turbocharger of claim 13, wherein the second fluid film fixed pad bearing has a lesser effective length than an effective length of the first fluid film fixed pad bearing.

15. The turbocharger of claim 14, wherein the effective length of the first fluid film fixed pad bearing is at least about 30% more than the effective length of the second fluid film fixed pad bearing.

16. The turbocharger of claim 13, wherein the first fluid film fixed pad bearing has a drop that is different than a drop of the second fluid film fixed pad bearing.

17. A turbocharger, comprising:
a compressor;
a turbine;
a shaft coupling the compressor to the turbine;
a first fluid film fixed pad bearing disposed about the shaft at a compressor end portion of the shaft; and
a second fluid film fixed pad bearing disposed about the shaft at a turbine end portion of the shaft, wherein the first and second fluid film fixed pad bearings have different clearance ratios relative to one another.

18. The turbocharger of claim 17, wherein the second fluid film fixed pad bearing has a greater clearance ratio than a clearance ratio of the first fluid film fixed pad bearing.

19. The turbocharger of claim 18, wherein the clearance ratio of the first fluid film fixed pad bearing is at least about 10% less than the clearance ratio of the second fluid film fixed pad bearing.

20. The turbocharger of claim 17, wherein the first fluid film fixed pad bearing has a drop that is different than a drop of the second fluid film fixed pad bearing.

* * * * *